(12) United States Patent
Huber et al.

(10) Patent No.: US 8,286,918 B2
(45) Date of Patent: Oct. 16, 2012

(54) FASTENING DEVICE OF A FLOOR MODULE

(75) Inventors: Thomas Huber, Schliersee (DE);
Richard Holzner, Stephanskirchen (DE)

(73) Assignee: Telair International GmbH (DE)

( * ) Notice: Subject to any disclaimer, the term of this patent is extended or adjusted under 35 U.S.C. 154(b) by 178 days.

(21) Appl. No.: 12/721,469

(22) Filed: Mar. 10, 2010

(65) Prior Publication Data
US 2010/0230544 A1  Sep. 16, 2010

(30) Foreign Application Priority Data
Mar. 10, 2009 (DE) .......... 10 2009 012 428

(51) Int. Cl.
*B64C 1/06* (2006.01)
(52) U.S. Cl. .................... 244/131; 244/118.1
(58) Field of Classification Search .......... 244/131, 244/118.1, 118.5, 121; 52/283, 285.3, 272, 52/289, 702; 403/157–159
See application file for complete search history.

(56) References Cited

U.S. PATENT DOCUMENTS

| 7,163,178 B2 * | 1/2007 | Ricaud ............... 244/118.1 |
| 7,625,623 B2 * | 12/2009 | Grose et al. ............ 428/119 |
| 2009/0302665 A1 * | 12/2009 | Dowty ............... 297/463.1 |
| 2010/0096502 A1 * | 4/2010 | Vanderwolk ........... 244/122 R |
| 2010/0314494 A1 * | 12/2010 | Gasser et al. ............ 244/131 |

FOREIGN PATENT DOCUMENTS

| DE | 19812014 C1 | 8/1999 |
| EP | 1 646 556 B1 | 4/2006 |
| EP | 1 646 557 B1 | 4/2006 |
| EP | 1 646 558 B1 | 11/2006 |
| WO | 2005/012083 A1 | 10/2005 |

OTHER PUBLICATIONS

Extended European Search Report dated Dec. 8, 2010.

* cited by examiner

*Primary Examiner* — Timothy D Collins
*Assistant Examiner* — Jamie S Stehle
(74) *Attorney, Agent, or Firm* — Barnes & Thornburg LLP

(57) ABSTRACT

A fastening device of a floor module in an aircraft hull is provided. The fastening device comprises an intermediate element that on one hand can be fastened to the aircraft hull using a joining device and on the other comprises a receiving device for a holding portion of the floor module. In this case the fastening device is designed in such a way that mobility of the holding portion relative to the aircraft is guaranteed in the aircraft's longitudinal direction by means of which it is possible to guarantee stress-free installation inside the aircraft hull.

8 Claims, 2 Drawing Sheets

FASTENING DEVICE OF A FLOOR MODULE

CROSS-REFERENCE TO RELATED APPLICATIONS

This application claims priority to foreign Patent Application No. DE 10 2009 012 428.4, filed on Mar. 10, 2009, the disclosure of which is incorporated herein by reference in its entirety.

FIELD OF THE INVENTION

The present invention relates to a fastening device of a floor module in an aircraft hull.

BACKGROUND OF THE INVENTION

Disclosed in EP 1 646 556 B1 and in EP 1 646 557 B1 is a cargo deck for accommodating cargo in the cargo hold of an aircraft, said deck being constructed of modules which may be assembled outside the aircraft hull and installed in the aircraft in a largely pre-assembled state. If the intention is to alter the aircraft's designated use, then the floor modules may be removed again and may be replaced by floor modules fitted out differently or by functional units (e.g. kitchen module or toilet module). It should be as easy as possible to carry out installation and removal.

SUMMARY OF THE INVENTION

Embodiments of the present invention advantageously provide a fastening device of a floor module in an aircraft hull which ensures easy installation and removal of a floor module.

In one embodiment, a fastening device of a floor module in an aircraft hull comprises an intermediate element which on one hand can be fastened to the aircraft hull using joining devices and which on the other comprises a receiving device for a holding portion of the floor module and which is designed in such a way that mobility of the holding portion relative to the aircraft hull is guaranteed in the aircraft's longitudinal direction.

This mobility not only ensures easier installation and removal but surprisingly it was also possible to determine that, due to this mobility in the aircraft's longitudinal direction, reduced stresses occur due to load changes on deformation of the aircraft hull.

The joining device is joined to the aircraft hull preferably free from play. This ensures that no abrasive wear can arise in the aircraft hull.

Preferably, the joining device is attached to a rib of the aircraft hull which guarantees a particularly high loading capacity. For this the joining device preferably comprises a unilateral flange which rests on the rib, as a result of which said freedom from play is ensured in a simple manner even with certain tolerances in the dimensions of the rib.

The receiving device preferably comprises a fork section between the shanks of which the holding portion is receivable with play (in the aircraft's longitudinal direction). Mobility is thus ensured at a defined point of the fastening device such that any signs of wear that arise are easily examinable. The fastening between receiving device and fork section is preferably effected by means of a bolt which passes through the holding portion and is fastened in the shanks. This guarantees easy assembly.

BRIEF DESCRIPTION OF THE DRAWINGS

An embodiment of the invention will be explained subsequently in greater detail on the basis of drawings.

DETAILED DESCRIPTION

Figure 1:
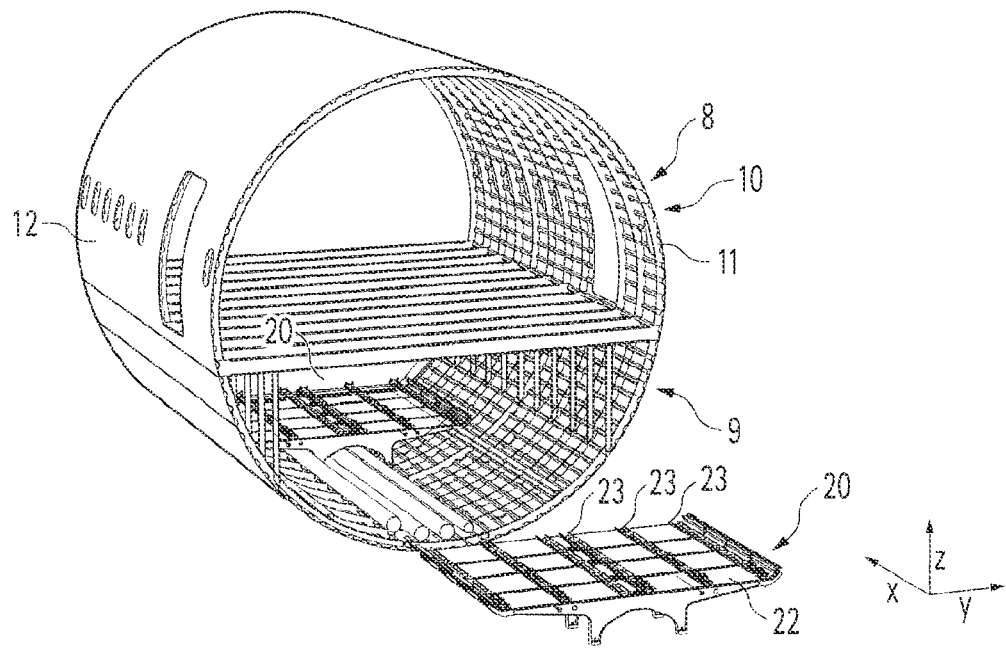
FIG. 1 is a perspective diagram of a section of an aircraft hull with a floor module installed and a floor module removed.

The invention will now be described with reference to the drawing figures, in which like reference numerals refer to like parts throughout.

Figure 2:
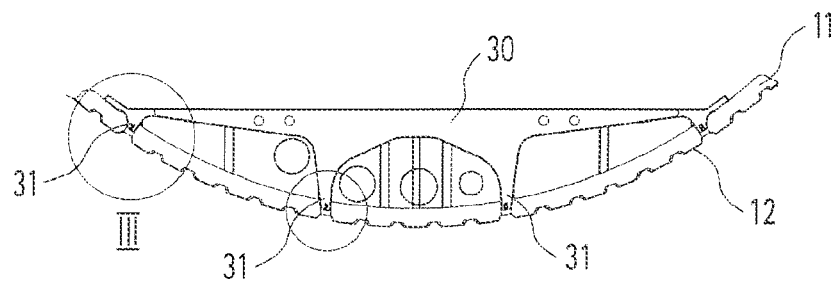
FIG. 2 is a view from above (in the aircraft's longitudinal direction) onto a section of the aircraft hull with floor module installed.

As depicted in FIG. 1, the interior of an aircraft hull 10 is divided into an upper section 8 and a lower section 9. Located in lower section 9 is the cargo hold addressed here in which floor modules 20 may be fastened. These comprise floor panels 22 and roller conveyors 23 which form a walkable surface. Floor panels 22 and roller conveyors 23 are attached to cross-members 30 which are fastened using holding portions 31 to ribs 11 of an outer skin 12 of aircraft hull 10 as is specifically illustrated in FIG. 2. On the diagram, the longitudinal direction of aircraft hull 10 is identified by x, the transverse direction by y and the vertical direction by z.

Figure 3:
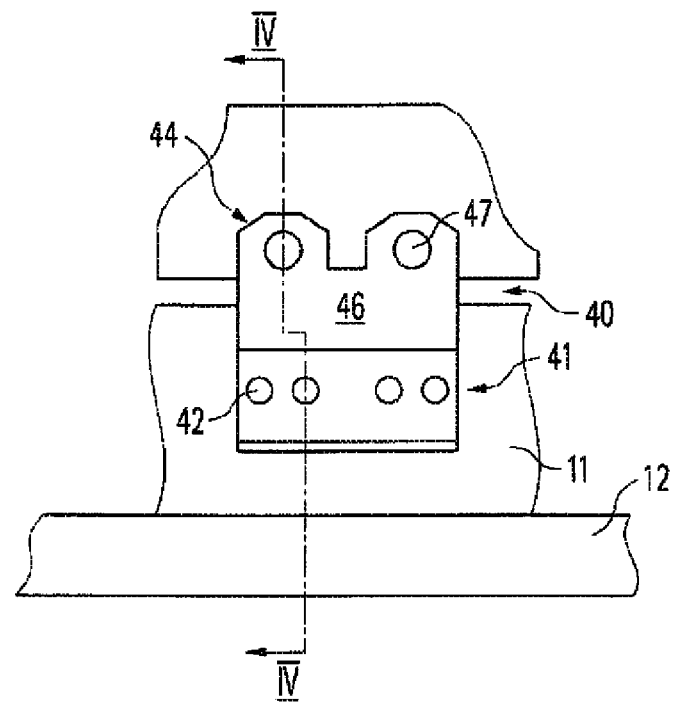
FIG. 3 is an enlarged detailed diagram of region III from FIG. 2.
Figure 4:
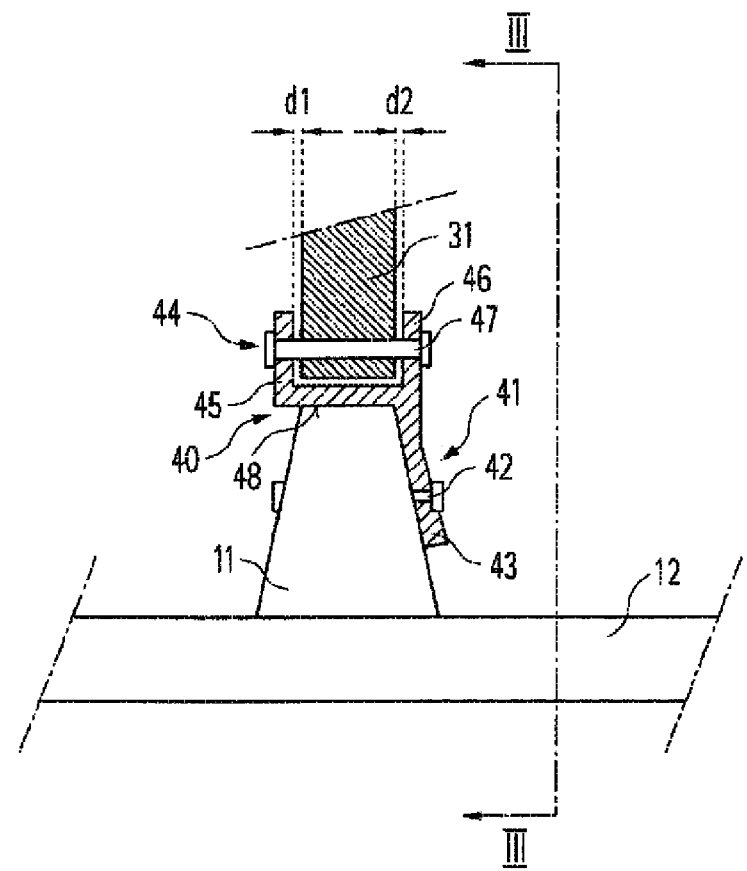
FIG. 4 is a sectional view along line IV-IV from FIG. 3.

FIGS. 3 and 4 illustrate in detail an intermediate element 40 which joins holding portions 31 of cross-members 30 with aircraft hull 10.

On one hand this intermediate element 40 comprises a joining device 41 for joining intermediate element 40 with the aircraft hull or rib 11. This joining device 41 is designed to be substantially L-shaped and on one hand comprises a unilateral flange 43 which extends in line with the profile of rib 11, while on the other hand a mounting portion 48 is provided with which joining device 41 rests on rib 11 in order to dissipate loads acting perpendicularly on hull 10 or outer skin 12.

Joining device 41 is joined in one piece to a receiving device 44 which is U-shaped in cross-section and has shanks 45, 46. Holding portion 31 of cross-member 30 is insertable between these shanks in such a way that play (d1, d2) remains between holding portion 31 and shanks 45, 46. Detachable bolts 47 which pass through shanks 45, 46 and holding portion 31 are used for fastening. In this case a certain sliding displaceability of bolt 47 is guaranteed within holding portion 31 such that no stresses can arise in the x direction during movements of the hull.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. An aircraft, comprising:
   at least one rib extending in a transverse direction of the aircraft;
   at least one floor module having at least one holding portion;
   a plurality of intermediate elements connected to the holding portion of the floor module and to the rib, wherein the holding portion and the intermediate element are connected by a receiving device, the receiving device or the holding portion being designed such that the mobility of the holding portion relative to the rib in a longitudinal direction of the aircraft is guaranteed, wherein the receiving device of the intermediate element comprises a fork section having a first and a second shank, wherein the holding portion is received between the shanks with play, the play guaranteeing the mobility of the holding portion relative to the rib in the longitudinal direction of the aircraft.

2. The aircraft according to claim 1, wherein the intermediate element includes a joining device, the joining device is joined free of play to the rib.

3. The aircraft according to claim 2, wherein the joining device comprises a unilateral flange which rests on the rib of the aircraft.

4. The aircraft according to claim 1, further comprising at least one bolt, insertable between the shanks, that passes through the holding portion, wherein the holding portion is movable in relation to the bolt.

5. A fastening device for joining a holding portion of a floor module to a rib of an aircraft hull, the fastening device comprising:
   an intermediate element adapted to be located between the rib of the aircraft hull and the holding portion of the floor module, the intermediate element including a joining device and a receiving device, the joining device including a flange adapted to be joined to the rib and a mounting portion adapted to rest on the rib, the receiving device being joined to the joining device and comprising a first shank and a second shank, the first shank and second shank adapted to be joined to the holding portion of the floor module with the holding portion located between the first shank and the second shank,
   whereby the holding portion of the floor module is adapted to be located between the first and second shanks of the receiving device with play between the holding portion and the receiving device such that the holding portion is movable with respect to the receiving device between the first shank and the second shank in the longitudinal direction of the aircraft hull.

6. The fastening device of claim 5 wherein the flange and mounting portion of the joining device are joined to one another in a substantially L-shaped manner.

7. The fastening device of claim 5 including a bolt adapted to extend through the first shank and second shank of the receiving device and through the holding portion of the floor module, whereby the holding portion of the floor module is adapted to be movable between the first shank and second shank of the receiving device with respect to the bolt.

8. The fastening device of claim 5 wherein the first shank and the second shank are joined to the mounting portion of the joining device.

\* \* \* \* \*